(12) United States Patent
Fujita et al.

(10) Patent No.: US 12,252,216 B2
(45) Date of Patent: Mar. 18, 2025

(54) REAR SPROCKET ASSEMBLY

(71) Applicant: SHIMANO INC., Sakai (JP)

(72) Inventors: Hiroshi Fujita, Sakai (JP); Yusuke Oda, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/342,717

(22) Filed: Jun. 27, 2023

(65) Prior Publication Data

US 2025/0002115 A1    Jan. 2, 2025

(51) Int. Cl.
*B62M 9/10*     (2006.01)
*B60B 27/02*    (2006.01)

(52) U.S. Cl.
CPC ............ *B62M 9/10* (2013.01); *B60B 27/023* (2013.01)

(58) Field of Classification Search
CPC ............................... B62M 9/10; B60B 27/023
See application file for complete search history.

(56) References Cited

U.S. PATENT DOCUMENTS

| | | | | |
|---|---|---|---|---|
| 5,503,600 | A * | 4/1996 | Berecz | F16H 55/30 474/160 |
| 6,382,381 | B1 * | 5/2002 | Okajima | B60B 1/042 192/64 |
| 7,931,553 | B2 * | 4/2011 | Tokuyama | B62M 9/10 474/81 |
| 8,764,594 | B2 * | 7/2014 | Dal Pra' | B62M 9/10 474/160 |
| 8,821,330 | B2 * | 9/2014 | Dal Pra' | B62M 9/10 474/160 |
| 9,376,165 | B2 * | 6/2016 | Oishi | B62M 9/10 |
| 9,415,835 | B2 * | 8/2016 | Tokuyama | B62M 9/12 |
| 9,511,819 | B1 * | 12/2016 | Watarai | B62M 9/10 |
| 9,550,547 | B2 * | 1/2017 | Valle | B62M 9/105 |
| 11,485,449 | B2 * | 11/2022 | Thrash | B62M 9/10 |
| 2004/0070166 | A1 * | 4/2004 | Valle | B62M 9/10 280/260 |
| 2006/0172840 | A1 * | 8/2006 | Kamada | B62M 9/10 474/160 |
| 2008/0188336 | A1 | 8/2008 | Tokuyama | |
| 2010/0009794 | A1 * | 1/2010 | Chiang | B62M 9/10 474/160 |

(Continued)

FOREIGN PATENT DOCUMENTS

| | | |
|---|---|---|
| EP | 1074462 A2 | 2/2001 |
| EP | 1700781 A2 | 9/2006 |
| EP | 2554468 A1 | 2/2013 |

*Primary Examiner* — Michael R Mansen
*Assistant Examiner* — Juan J Campos, Jr.
(74) *Attorney, Agent, or Firm* — MORI & WARD, LLP

(57) ABSTRACT

A rear sprocket assembly comprises a sprocket carrier, a first sprocket, and a second sprocket. The sprocket carrier includes at least one sprocket mounting portion having a first radial section and a second radial section. The first radial section has a first maximum axial length with respect to the axial direction. The second radial section has a second maximum axial length with respect to the axial direction. The second maximum axial length is larger than the first maximum axial length. At least one second mounted portion of the second sprocket is configured to axially contact the first radial section and the second radial section of the at least one sprocket mounting portion of the sprocket carrier with respect to the axial direction.

15 Claims, 18 Drawing Sheets

(56) References Cited

U.S. PATENT DOCUMENTS

2011/0092327 A1\* 4/2011 Oishi .................. B62M 9/10
                                                    474/160
2012/0225745 A1\* 9/2012 Oishi .................. B62M 9/125
                                                    474/160

\* cited by examiner

REAR SPROCKET ASSEMBLY

BACKGROUND

Technical Field

The present invention relates to a rear sprocket assembly.

Background Information

A human powered vehicle includes a sprocket assembly configured to be engaged with a chain. The sprocket assembly includes a plurality of sprockets. One of objects of the present disclosure is to maintain necessary rigidity of a sprocket and a sprocket carrier of the sprocket assembly while selecting a lighter material of the sprocket.

SUMMARY

In accordance with a first aspect of the present invention, a rear sprocket assembly for a human powered vehicle has a rotational center axis. The rotational center axis defines an axial direction, a radial direction and a circumferential direction. The rear sprocket assembly comprises a sprocket carrier, a first sprocket, and a second sprocket. The sprocket carrier has an axially outwardly facing carrier-surface and an axially inwardly facing carrier-surface provided on a reverse side of the axially outwardly facing carrier-surface in the axial direction. The axially inwardly facing carrier-surface is configured to face toward an axial center plane of the human powered vehicle in the axial direction in a mounted state where the rear sprocket assembly is mounted to the human powered vehicle. The sprocket carrier includes at least one sprocket mounting portion having a first radial section and a second radial section positioned radially inwardly from the first radial section in the radial direction. The first radial section has a first maximum axial length with respect to the axial direction. The second radial section has a second maximum axial length with respect to the axial direction. The second maximum axial length is larger than the first maximum axial length. The first sprocket includes a first sprocket body and a plurality of first sprocket teeth extending radially outwardly from the first sprocket body in the radial direction. The plurality of first sprocket teeth is disposed on the first sprocket body in the circumferential direction. The first sprocket has a first total tooth number, a first axially outwardly facing surface and a first axially inwardly facing surface provided on a reverse side of the first axially outwardly facing surface in the axial direction. The first axially inwardly facing surface is configured to face toward the axial center plane of the human powered vehicle in the axial direction in the mounted state. The first sprocket body has at least one first mounted portion configured to be mounted to the axially inwardly facing carrier-surface of the at least one sprocket mounting portion of the sprocket carrier. The at least one first mounted portion is configured to axially contact the first radial section of the at least one sprocket mounting portion of the sprocket carrier with respect to the axial direction. The second sprocket includes a second sprocket body and a plurality of second sprocket teeth extending radially outwardly from the second sprocket body in the radial direction. The plurality of second sprocket teeth is disposed on the second sprocket body in the circumferential direction. The second sprocket has a second total tooth number, a second axially outwardly facing surface and a second axially inwardly facing surface provided on a reverse side of the second axially outwardly facing surface in the axial direction. The second total tooth number is smaller than the first total tooth number of the first sprocket. The second axially inwardly facing surface is configured to face toward the first axially outwardly facing surface of the first sprocket in the axial direction. The second sprocket body has at least one second mounted portion configured to be mounted to the axially outwardly facing carrier-surface of the at least one sprocket mounting portion of the sprocket carrier. The at least one second mounted portion is configured to axially contact the first radial section and the second radial section of the at least one sprocket mounting portion of the sprocket carrier with respect to the axial direction. The second sprocket is adjacent to the first sprocket without another sprocket between the first sprocket and the second sprocket in the axial direction.

With the rear sprocket assembly according to the first aspect, since the at least one second mounted portion is configured to axially contact the first radial section and the second radial section with respect to the axial direction, the at least one second mounted portion can improve rigidity of the at least one sprocket mounting portion of the sprocket carrier. Thus, it is possible to reduce an axial length of the first radial section of the at least one sprocket mounting portion of the sprocket carrier, enabling an axial thickness of the first sprocket and an axial thickness of the second sprocket to be larger. Accordingly, it is possible to maintain necessary rigidity of the first sprocket and necessary rigidity of the second sprocket while selecting a lighter material of the first sprocket.

In accordance with a second aspect of the present invention, the rear sprocket assembly according to the first aspect is configured so that the first sprocket body has a first maximum axial body-length that is equal to or larger than 2 mm.

With the rear sprocket assembly according to the second aspect, it is possible to reliably maintain necessary rigidity of the first sprocket while selecting a lighter material of the first sprocket.

In accordance with a third aspect of the present invention, the rear sprocket assembly according to the second aspect is configured so that the first maximum axial body-length is equal to or smaller than 3.5 mm.

With the rear sprocket assembly according to the third aspect, it is possible to ensure rigidity of the first radial section and the second radial section of the at least one sprocket mounting portion of the sprocket carrier while maintaining necessary rigidity of the first sprocket.

In accordance with a fourth aspect of the present invention, the rear sprocket assembly according to any one of the first to third aspects is configured so that the second sprocket body has a second maximum axial body-length that is equal to or larger than 1.5 mm.

With the rear sprocket assembly according to the fourth aspect, it is possible to maintain necessary rigidity of the second sprocket while selecting a lighter material of the second sprocket.

In accordance with a fifth aspect of the present invention, the rear sprocket assembly according to the fourth aspect is configured so that the second maximum axial body-length is equal to or smaller than 3.5 mm.

With the rear sprocket assembly according to the fifth aspect, it is possible to ensure rigidity of the first radial section and the second radial section of the at least one sprocket mounting portion of the sprocket carrier while maintaining necessary rigidity of the second sprocket.

In accordance with a sixth aspect of the present invention, the rear sprocket assembly according to any one of the first to fifth aspects is configured so that the first maximum axial length of the first radial section is equal to or larger than 1.3 mm.

With the rear sprocket assembly according to the sixth aspect, it is possible to ensure rigidity of the first radial section of the at least one sprocket mounting portion of the sprocket carrier.

In accordance with a seventh aspect of the present invention, the rear sprocket assembly according to the sixth aspect is configured so that the first maximum axial length of the first radial section is equal to or smaller than 3 mm.

With the rear sprocket assembly according to the seventh aspect, it is possible to save weight of the sprocket carrier.

In accordance with an eighth aspect of the present invention, the rear sprocket assembly according to any one of the first to seventh aspects is configured so that the second maximum axial length of the second radial section is equal to or larger than 3.5 mm.

With the rear sprocket assembly according to the eighth aspect, it is possible to ensure rigidity of the second radial section of the at least one sprocket mounting portion of the sprocket carrier while selecting a lighter material of the sprocket carrier.

In accordance with a ninth aspect of the present invention, the rear sprocket assembly according to the eighth aspect is configured so that the second maximum axial length of the second radial section is equal to or smaller than 5 mm.

With the rear sprocket assembly according to the ninth aspect, it is possible to save weight of the sprocket carrier.

In accordance with a tenth aspect of the present invention, the rear sprocket assembly according to any one of the first to ninth aspects is configured so that the first sprocket is made of aluminum.

With the rear sprocket assembly according to the tenth aspect, it is possible to save weight of the first sprocket.

In accordance with an eleventh aspect of the present invention, the rear sprocket assembly according to any one of the first to tenth aspects is configured so that the second sprocket is made of iron.

With the rear sprocket assembly according to the eleventh aspect, it is possible to maintain necessary rigidity of the second sprocket.

In accordance with a twelfth aspect of the present invention, the rear sprocket assembly according to any one of the first to eleventh aspects is configured so that the second sprocket is made of aluminum.

With the rear sprocket assembly according to the twelfth aspect, it is possible to save weight of the second sprocket.

In accordance with a thirteenth aspect of the present invention, the rear sprocket assembly according to any one of the first to twelfth aspects is configured so that the sprocket carrier is made of one of aluminum and a non-metallic material.

With the rear sprocket assembly according to the thirteenth aspect, it is possible to save weight of the sprocket carrier.

In accordance with a fourteenth aspect of the present invention, the rear sprocket assembly according to any one of the first to thirteenth aspects is configured so that the first sprocket and the second sprocket are mounted to the at least one sprocket mounting portion of the sprocket carrier by at least one common fastener.

With the rear sprocket assembly according to the fourteenth aspect, it is possible to reduce the total number of parts, reducing the manufacturing cost of the rear sprocket assembly or improving the productivity of the rear sprocket assembly.

In accordance with a fifteenth aspect of the present invention, the rear sprocket assembly according to any one of the first to fourteenth aspects is configured so that the at least one first mounted portion of the first sprocket body is configured to be free of axial contact with the second radial section of the at least one sprocket mounting portion of the sprocket carrier.

With the rear sprocket assembly according to the fifteenth aspect, it is possible to increase an axial thickness of the first sprocket. Thus, it is possible to reliably maintain necessary rigidity of the first sprocket while selecting a lighter material of the first sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
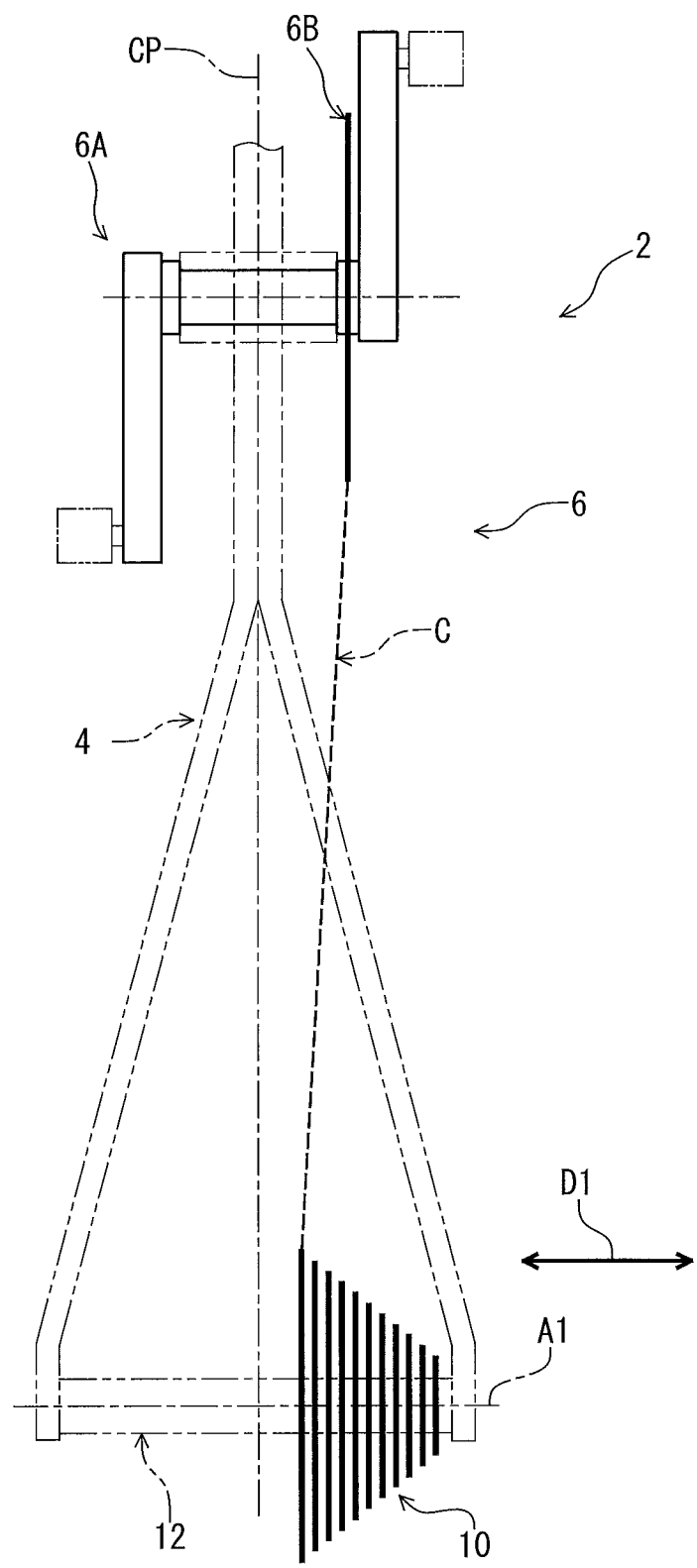
FIG. 1 is a schematic diagram of a human powered vehicle including a rear sprocket assembly in accordance with one of embodiments.

The embodiments will now be described with reference to the accompanying drawings, wherein like reference numerals designate corresponding or identical elements throughout the various drawings.

As seen in FIG. 1, a human powered vehicle 2 includes a vehicle body 4 and a drive train 6. The drive train 6 includes a rear sprocket assembly 10 and a rear hub assembly 12. The rear hub assembly 12 is mounted to the vehicle body 4. The rear sprocket assembly 10 is configured to be mounted to the rear hub assembly 12 for the human powered vehicle 2. The rear sprocket assembly 10 for the human powered vehicle 2 has a rotational center axis A1. The rotational center axis A1 defines an axial direction D1, a radial direction, and a circumferential direction D2 (see e.g., FIG. 3). The rear sprocket assembly 10 is rotatably supported by the rear hub assembly 12 relative to the vehicle body 4 about the rotational center axis A1. The human powered vehicle 2 has an axial center plane CP. The axial center plane CP is defined in a transverse center position of the vehicle body 4 of the human powered vehicle 2. The axial center plane CP is perpendicular to the rotational center axis A1.

The drive train 6 includes a crank assembly 6A, a front sprocket 6B, and a drive chain C. The crank assembly 6A is rotatably mounted to the vehicle body 4. The front sprocket 6B is mounted to crank assembly 6A. The drive chain C is engaged with the front sprocket 6B and the rear sprocket assembly 10 to transmit pedaling force from the front sprocket 6B to the rear sprocket assembly 10. The front sprocket 6B includes a single sprocket wheel in the present embodiment. However, the front sprocket 6B can include a plurality of sprocket wheels.

In the present application, the term "human powered vehicle" includes a vehicle to travel with a motive power including at least a human power of a user who rides the vehicle. The human powered vehicle includes a various kind of bicycles such as a mountain bike, a road bike, a city bike, a cargo bike, a hand bike, and a recumbent bike. Furthermore, the human powered vehicle includes an electric bike called as an E-bike. The electric bike includes an electrically assisted bicycle configured to assist propulsion of a vehicle with an electric motor. However, a total number of wheels of the human powered vehicle is not limited to two. For example, the human powered vehicle includes a vehicle having one wheel or three or more wheels. Especially, the human powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human powered vehicle 2 with facing a handlebar or steering. Examples of the user's standard position include a saddle and a seat. Accordingly, these terms, as utilized to describe the rear sprocket assembly 10 or other components, should be interpreted relative to the human powered vehicle 2 equipped with the rear sprocket assembly 10 or other components as used in an upright riding position on a horizontal surface.

Figure 2:
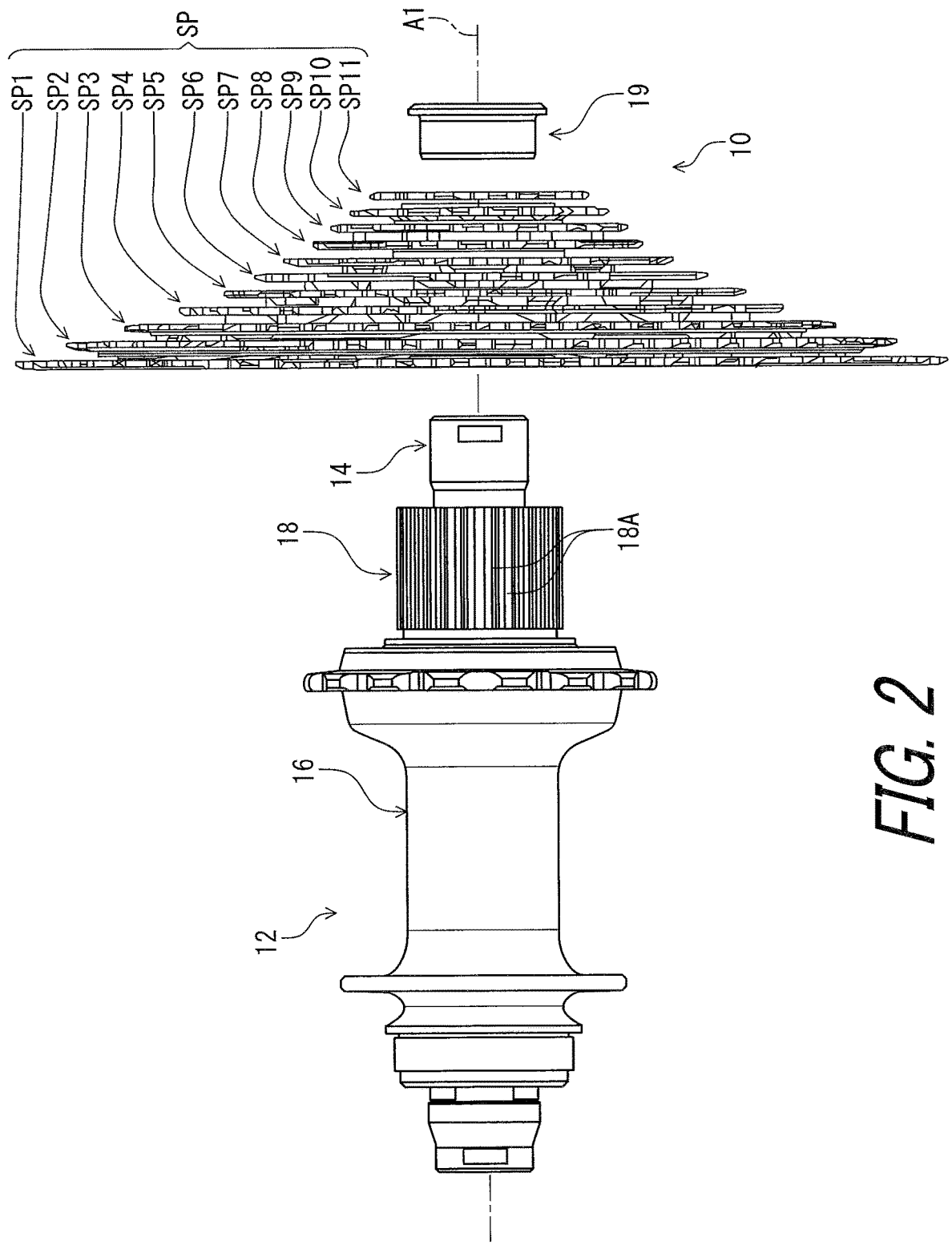
FIG. 2 is an exploded rear view of the rear sprocket assembly and a rear hub assembly of the human powered vehicle illustrated in FIG. 1.

As seen in FIG. 2, the rear sprocket assembly 10 includes a plurality of rear sprockets SP. The plurality of rear sprockets SP is configured to engage with the drive chain C. The plurality of rear sprockets SP includes first to twelfth sprockets SP1 to SP11. Namely, the rear sprocket assembly 10 comprises the first sprocket SP1 and the second sprocket SP2. In the present embodiment, the total number of the plurality of rear sprockets SP is 11. However, the total number of the plurality of rear sprockets SP is not limited to 11.

The rear hub assembly 12 includes a hub axle 14, a hub body 16, and a sprocket support body 18. The hub axle 14 is configured to be mounted to the vehicle body 4 (see e.g., FIG. 1) of the human powered vehicle 2. The hub body 16 is rotatably mounted on the hub axle 14 about the rotational center axis A1. The sprocket support body 18 is rotatably mounted on the hub axle 14 about the rotational center axis A1.

The rear sprocket assembly 10 is configured to be mounted to the sprocket support body 18. The sprocket support body 18 includes a plurality of external spline teeth 18A. The rear sprocket assembly 10 is configured to engage with the plurality of external spline teeth 18A of the sprocket support body 18. The rear sprocket assembly 10 includes a lock member 19. The first to eleven sprockets SP1 to SP11 are coupled to the sprocket support body 18 with the lock member 19.

Figure 3:
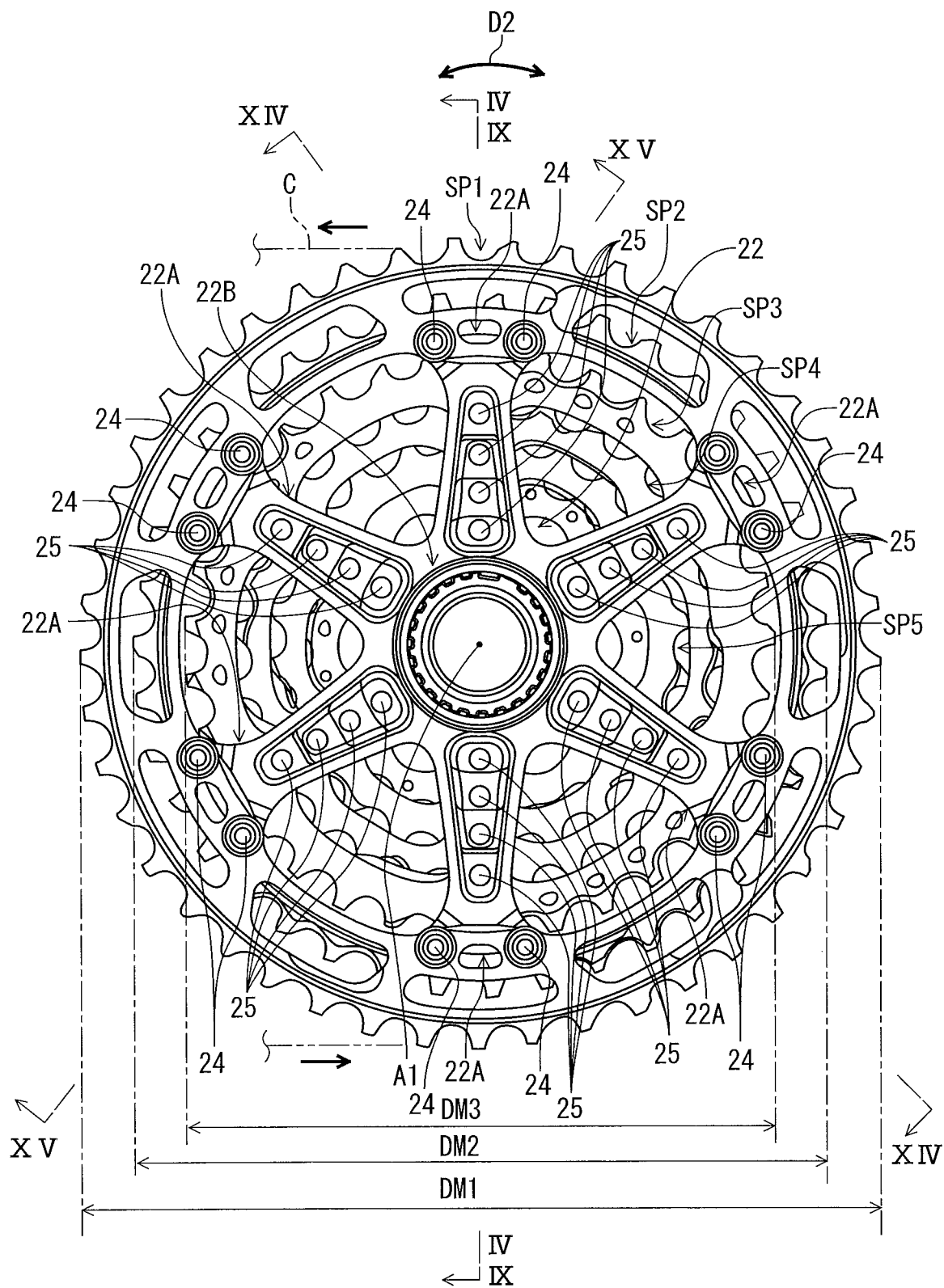
FIG. 3 is a side elevational view of the rear sprocket assembly illustrated in FIG. 1.

As seen in FIG. 3, the first sprocket SP1 has a first sprocket outer diameter DM1. The second sprocket SP2 has a second sprocket outer diameter DM2 smaller than the first sprocket outer diameter DM1. The third sprocket SP3 has a third sprocket outer diameter DM3 smaller than the second sprocket outer diameter DM2. The first sprocket SP1 is the largest sprocket in the rear sprocket assembly 10. The eleventh sprocket SP11 is the smallest sprocket in the rear sprocket assembly 10. The first sprocket SP1 can also be referred to as a low-gear sprocket SP1. The eleventh sprocket SP11 can also be referred to as a top-gear sprocket SP11.

Figure 4:
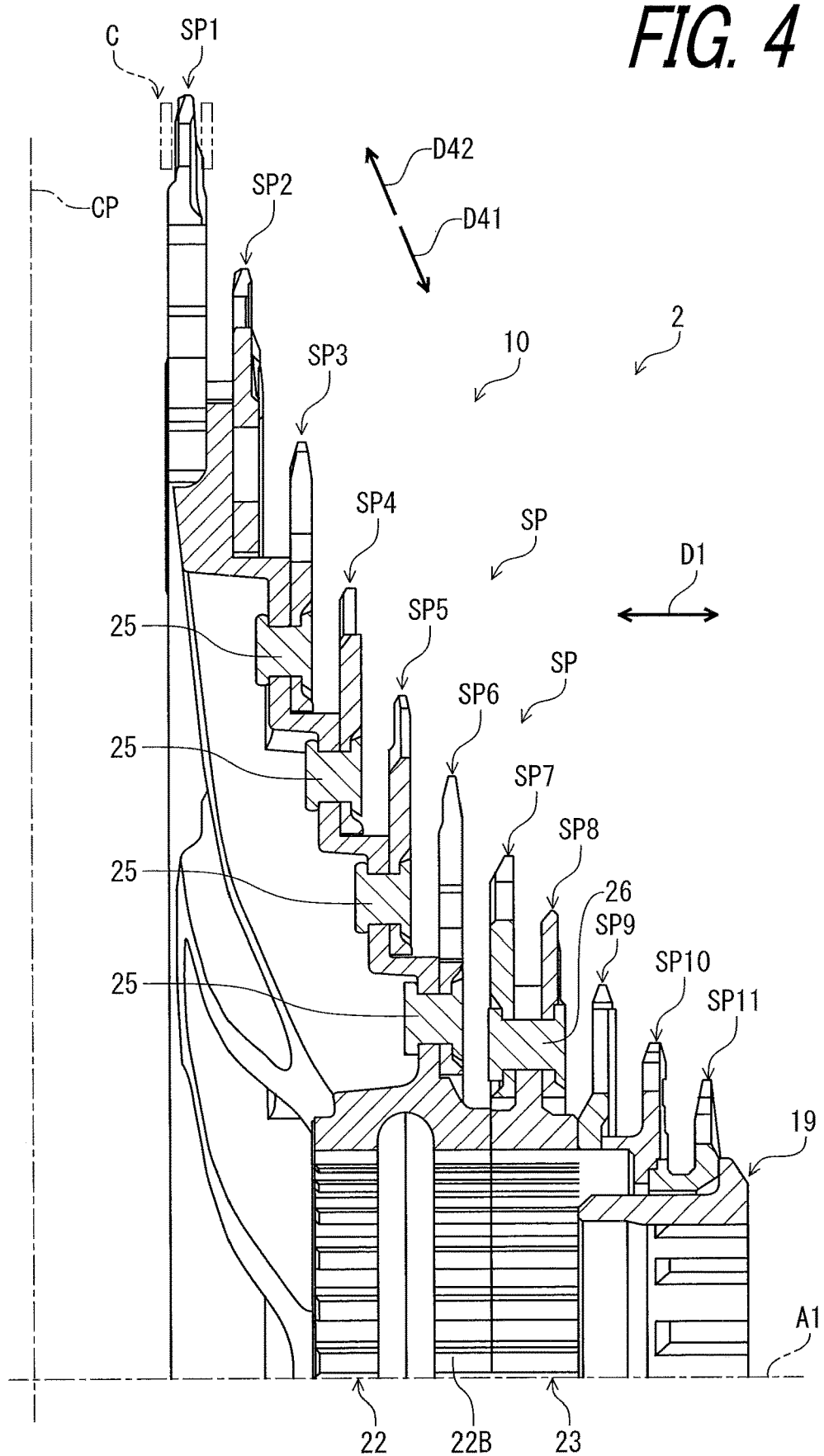
FIG. 4 is a cross-sectional view of the rear sprocket assembly taken along line IV-IV of FIG. 3.

As seen in FIG. 4, for example, upshifting occurs the drive chain C is shifted from a sprocket to a neighboring smaller sprocket in an upshifting direction D41. Downshifting occurs the drive chain C is shifted from a sprocket to a neighboring larger sprocket in a downshifting direction D42.

The second sprocket SP2 is adjacent to the first sprocket SP1 without another sprocket between the first sprocket SP1 and the second sprocket SP2 in the axial direction D1. The third sprocket SP3 is adjacent to the second sprocket SP2 without another sprocket between the second sprocket SP2 and the third sprocket SP3 in the axial direction D1.

As seen in FIG. 4, the rear sprocket assembly 10 comprises a sprocket carrier 22. The rear sprocket assembly 10 includes an additional sprocket carrier 23. The first to sixth sprockets SP1 to SP6 are mounted on the sprocket carrier 22. The seventh and eighth sprockets SP7 and SP8 are mounted on the additional sprocket carrier 23.

As seen in FIG. 3, the first sprocket SP1 and the second sprocket SP2 are mounted to the sprocket carrier 22 with first fasteners 24 such as rivets. The third to sixth sprockets SP3 to SP6 are mounted to the sprocket carrier 22 with second fasteners 25 such as rivets. As seen in FIG. 4, the seventh and eighth sprockets SP7 to SP8 are mounted to the additional sprocket carrier 23 with fasteners 26 such as rivets. The ninth to eleventh sprockets SP9 to SP11 are held between the additional sprocket carrier 23 and the lock member 19. However, the structure of the sprocket carrier 22 is not limited to the structure illustrated in FIG. 4.

As seen in FIG. 3, the sprocket carrier 22 includes at least two arms 22A and a hub engagement part 22B. The at least two arms 22A extend radially outwardly from the hub engagement part 22B. The hub engagement part 22B is configured to be engaged with the sprocket support body 18. The hub engagement part 22B includes a plurality of teeth. The first sprocket SP1 and the second sprocket SP2 are mounted to each arm of the at least two arms 22A with the first fastener 24. The third to sixth sprockets SP3 to SP6 are mounted to each arm of the at least two arms 22A with the second fasteners 25.

Figure 5:
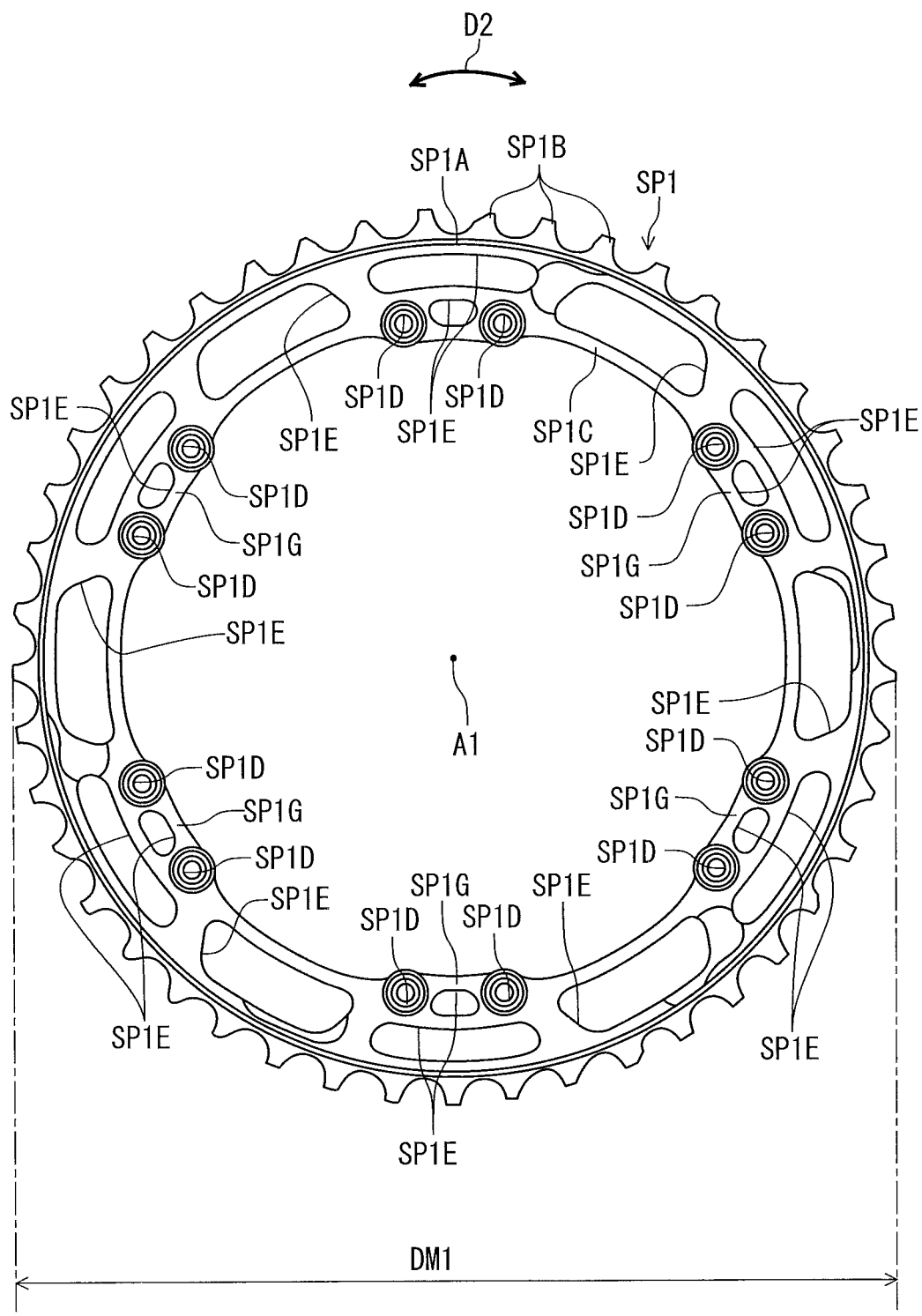
FIG. 5 is a side elevational view of a sprocket of the rear sprocket assembly illustrated in FIG. 3.

As seen in FIG. 5, the first sprocket SP1 includes a first sprocket body SP1A and a plurality of first sprocket teeth SP1B. The plurality of first sprocket teeth SP1B extends radially outwardly from the first sprocket body SP1A in the radial direction. The plurality of first sprocket teeth SP1B is disposed on the first sprocket body SP1A in the circumferential direction D2. The plurality of first sprocket teeth SP1B defines the first sprocket outer diameter DM1.

The first sprocket SP1 has a first total tooth number. The first total tooth number is a total number of the first sprocket teeth SP1B. In the present embodiment, the first total tooth number is 45. However, the first total tooth number is not limited to the above total tooth number.

The first sprocket body SP1A includes a first radially inner periphery SP1C. The first sprocket body SP1A includes a plurality of first fastener holes SP1D. The first fastener 24 extends through the first fastener hole SP1D in a state where the first sprocket SP1 is fastened to the sprocket carrier 22 with the first fastener 24 (see e.g., FIG. 3). The first sprocket body SP1A includes a plurality of first openings SP1E.

Figure 6:
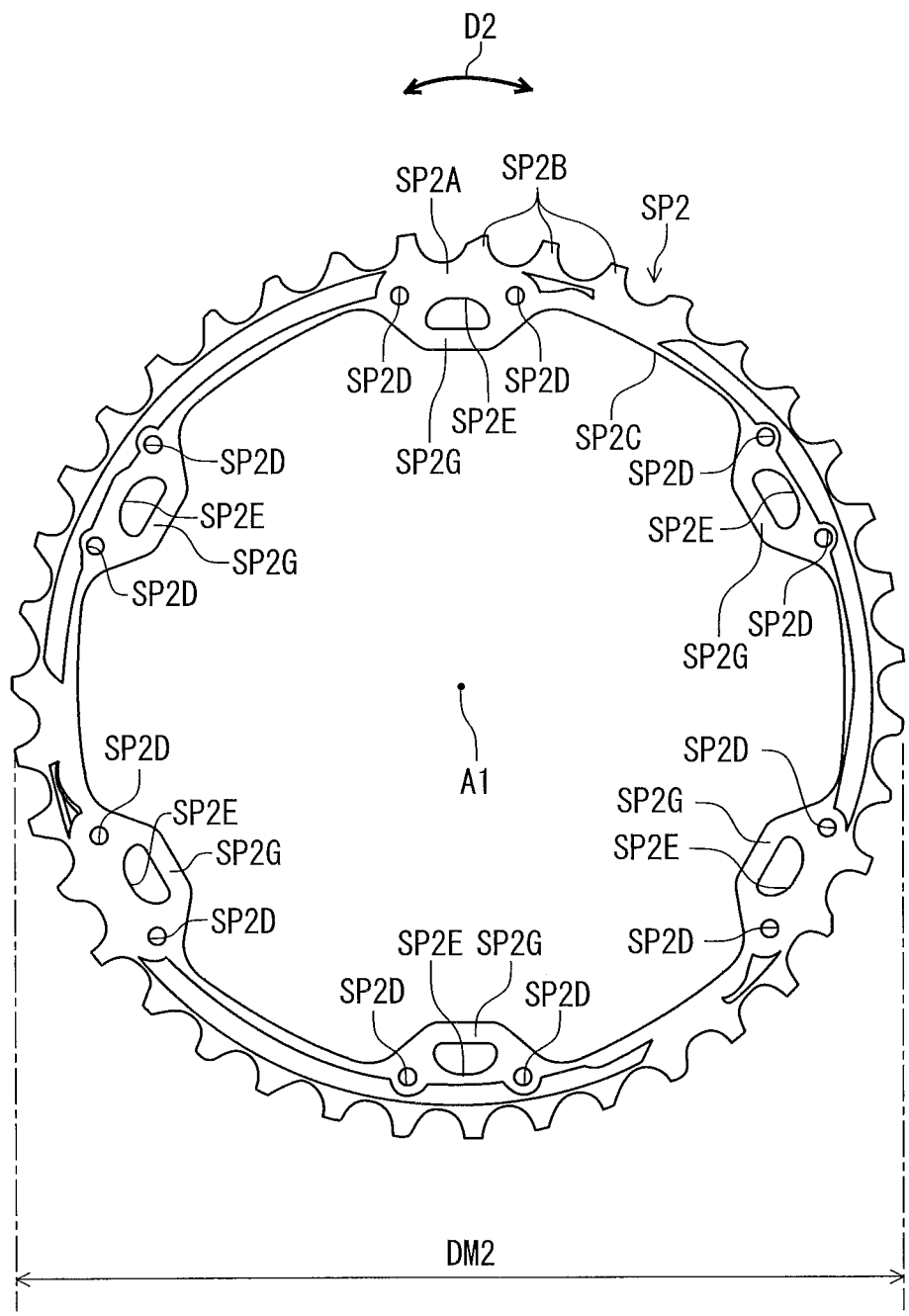
FIG. 6 is a side elevational view of a sprocket of the rear sprocket assembly illustrated in FIG. 3.

As seen in FIG. 6, the second sprocket SP2 includes a second sprocket body SP2A and a plurality of second sprocket teeth SP2B. The plurality of second sprocket teeth SP2B extends radially outwardly from the second sprocket body SP2A in the radial direction. The plurality of second sprocket teeth SP2B is disposed on the second sprocket body SP2A in the circumferential direction D2. The plurality of second sprocket teeth SP2B defines the second sprocket outer diameter DM2.

The second sprocket SP2 has a second total tooth number. The second total tooth number is a total number of the second sprocket teeth SP2B. In the present embodiment, the second total tooth number is 39. The second total tooth number is smaller than the first total tooth number of the first sprocket SP1. However, the second total tooth number is not limited to the above total tooth number.

The second sprocket body SP2A includes a second radially inner periphery SP2C. The second sprocket body SP2A includes a plurality of second fastener holes SP2D. The first fastener 24 extends through the second fastener hole SP2D in a state where the second sprocket SP2 is fastened to the sprocket carrier 22 with the first fastener 24 (see e.g., FIG. 3). The second sprocket body SP2A includes a plurality of second openings SP2E.

Figure 7:
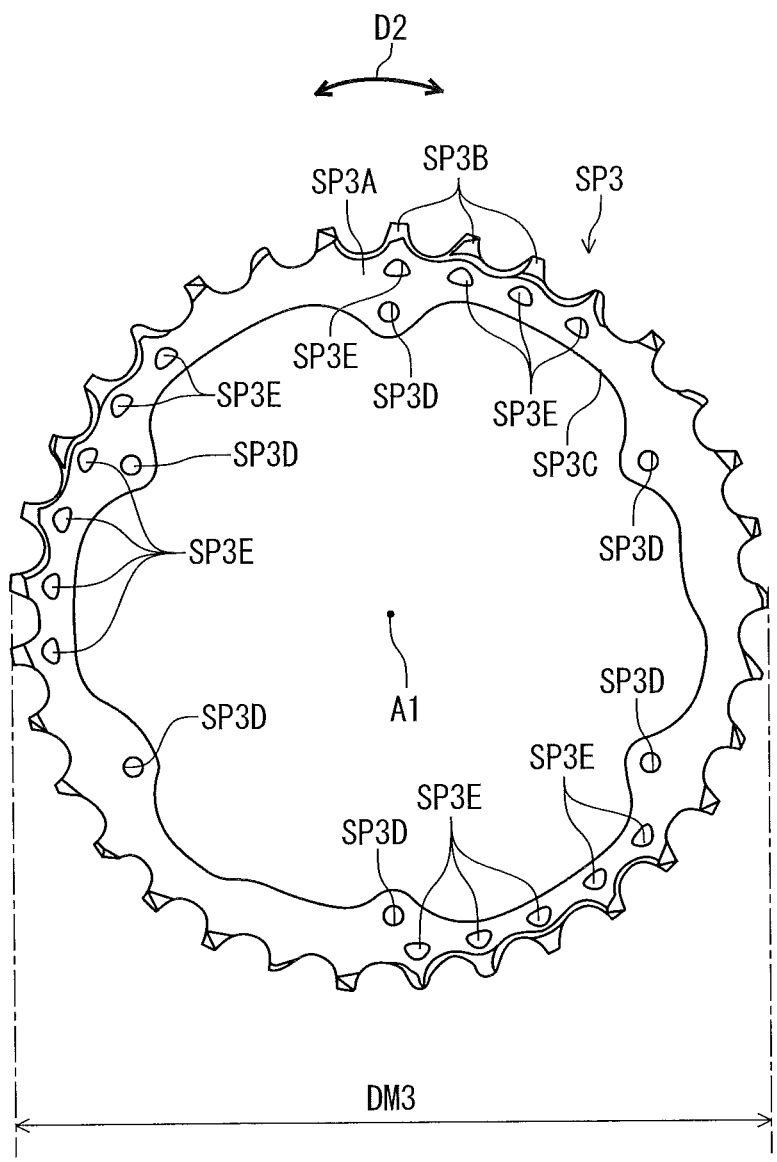
FIG. 7 is a side elevational view of a sprocket of the rear sprocket assembly illustrated in FIG. 3.

As seen in FIG. 7, the third sprocket SP3 includes a third sprocket body SP3A and a plurality of third sprocket teeth SP3B. The plurality of third sprocket teeth SP3B extends radially outwardly from the third sprocket body SP3A in the radial direction. The plurality of third sprocket teeth SP3B defines the third sprocket outer diameter DM3.

The third sprocket SP3 has a third total tooth number. The third total tooth number is a total number of the third sprocket teeth SP3B. In the present embodiment, the third total tooth number is 33. The third total tooth number is smaller than the second total tooth number of the second sprocket SP2. However, the third total tooth number is not limited to the above total tooth number.

The third sprocket body SP3A includes a third radially inner periphery SP3C. The third sprocket body SP3A includes a plurality of third fastener holes SP3D. The second fastener 25 extends through the third fastener hole SP3D in a state where the third sprocket SP3 is fastened to the sprocket carrier 22 with the second fastener 25 (see e.g., FIG. 4). The third sprocket body SP3A includes a plurality of third openings SP3E.

Figure 8:
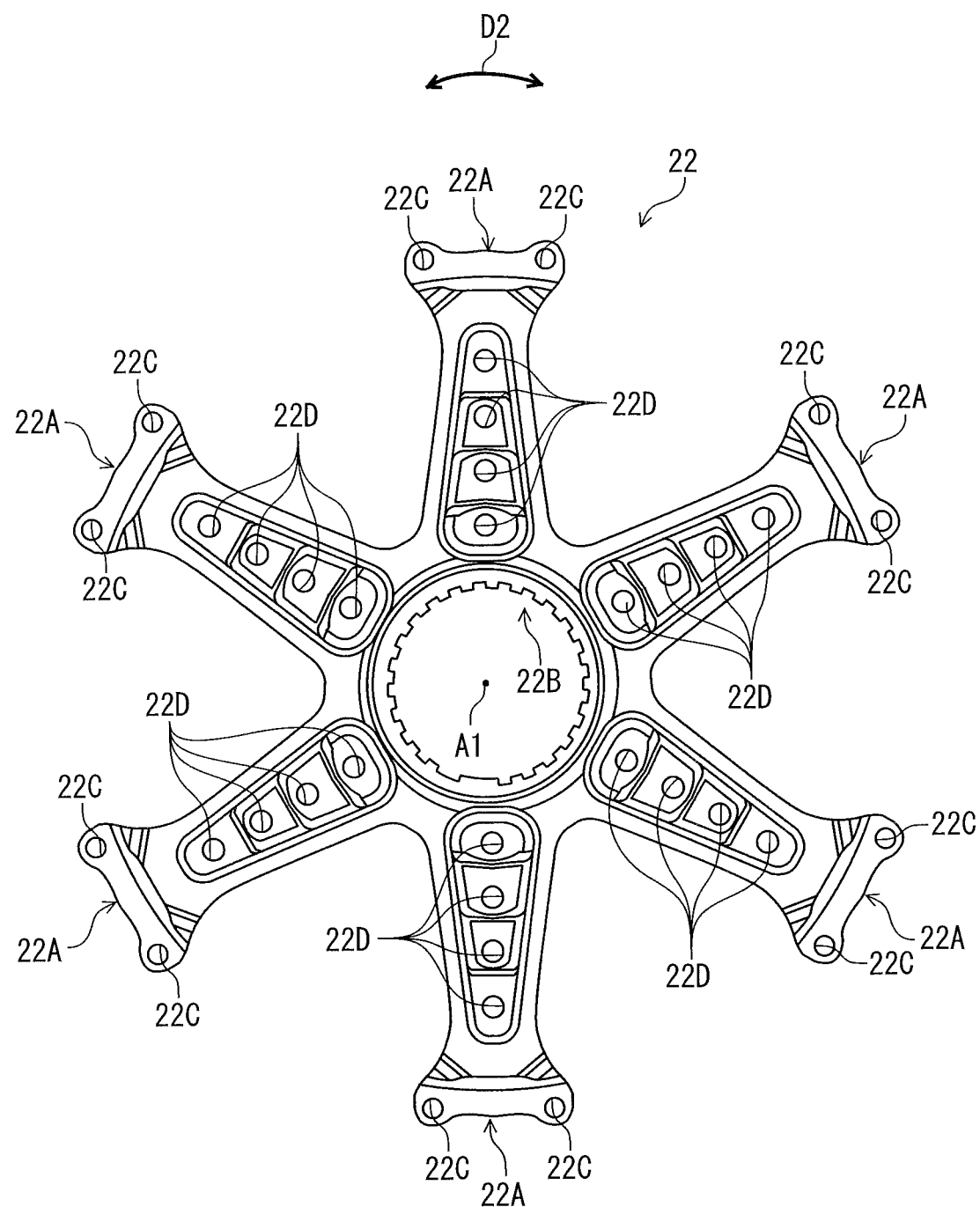
FIG. 8 is a side elevational view of a sprocket carrier of the rear sprocket assembly illustrated in FIG. 3.

As seen in FIG. 8, the sprocket carrier 22 includes a plurality of first holes 22C and a plurality of second holes 22D. At least one hole of the plurality of first holes 22C is provided radially outwardly of at least one hole of the second holes 22D. The arm 22A includes two holes of the plurality of first holes 22C and four holes of the plurality of second holes 22D.

Figure 9:
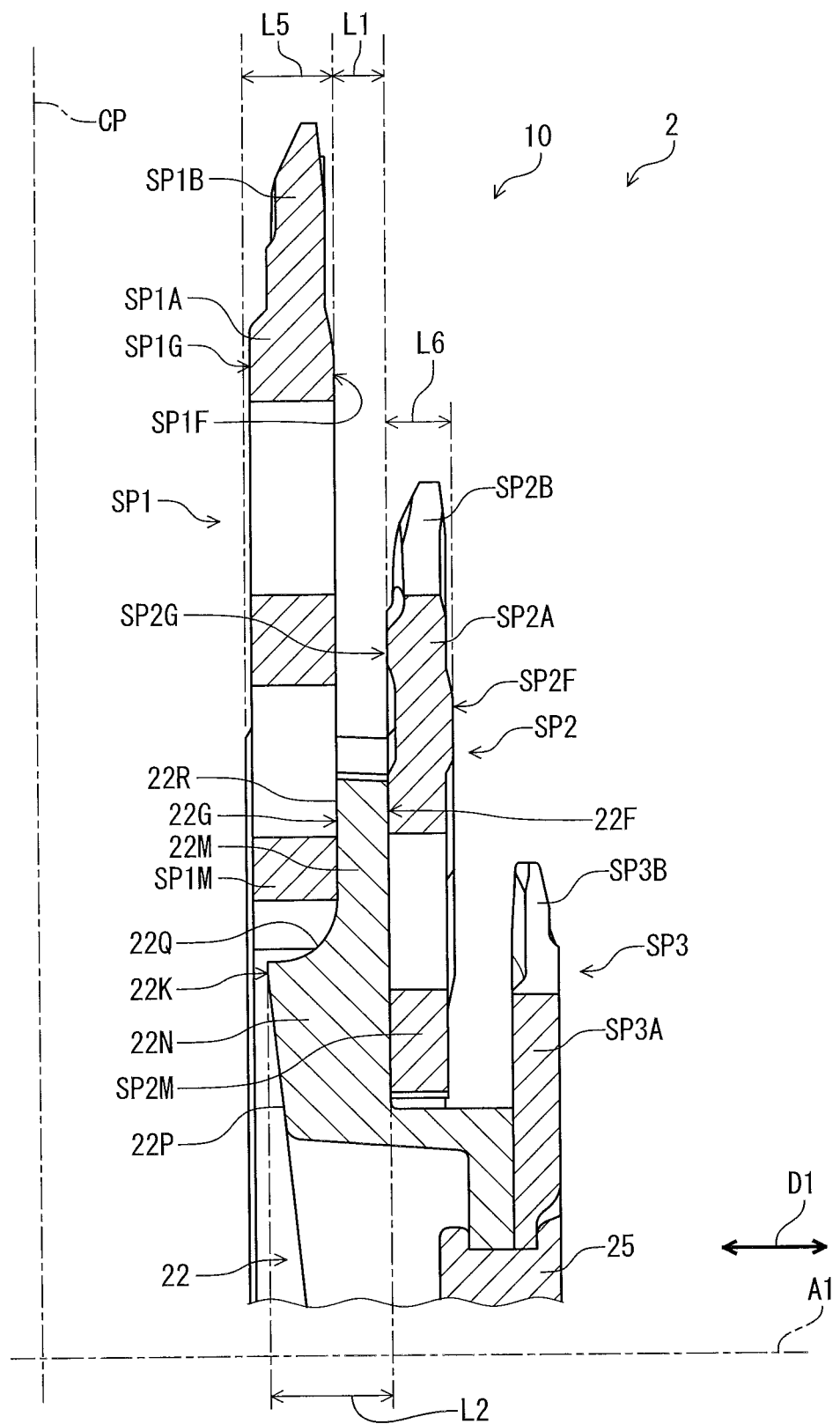
FIG. 9 is a cross-sectional view of the rear sprocket assembly taken along line IX-IX of FIG. 3.

As seen in FIG. 9, the first sprocket SP1 has a first axially outwardly facing surface SP1F and a first axially inwardly facing surface SP1G. The first axially inwardly facing surface SP1G is provided on a reverse side of the first axially outwardly facing surface SP1F in the axial direction D1. The first axially inwardly facing surface SP1G is configured to face toward the axial center plane CP of the human powered vehicle 2 in the axial direction D1 in a mounted state where the rear sprocket assembly 10 is mounted to the human powered vehicle 2.

The second sprocket SP2 has a second axially outwardly facing surface SP2F and a second axially inwardly facing surface SP2G. The second axially inwardly facing surface SP2G is provided on a reverse side of the second axially outwardly facing surface SP2F in the axial direction D1. The second axially inwardly facing surface SP2G is configured to face toward the first axially outwardly facing surface SP1F of the first sprocket SP1 in the axial direction D1.

The third sprocket SP3 has a third axially outwardly facing surface SP3F and a third axially inwardly facing surface SP3G. The third axially inwardly facing surface SP3G is provided on a reverse side of the third axially outwardly facing surface SP3F in the axial direction D1. The third axially inwardly facing surface SP3G is configured to face toward the second axially outwardly facing surface SP2F of the second sprocket SP2 in the axial direction D1.

As seen in FIG. 9, the sprocket carrier 22 includes at least one sprocket mounting portion 22K. The at least one sprocket mounting portion 22K has a first radial section 22M and a second radial section 22N. The second radial section 22N is positioned radially inwardly from the first radial section 22M in the radial direction. The first radial section 22M extends radially outwardly from the second radial section 22N.

In the present embodiment, the sprocket carrier 22 includes at least two sprocket mounting portions 22K. The at least two sprocket mounting portions 22K are respectively provided to the at least two arms 22A. The at least two sprocket mounting portions 22K are respectively provided to at least two radially outer ends of the at least two arms 22A. The sprocket mounting portion 22K is provided to the radially outer end of the arm 22A.

The sprocket carrier 22 has an axially outwardly facing carrier-surface 22F and an axially inwardly facing carrier-surface 22G. The axially inwardly facing carrier-surface 22G is provided on a reverse side of the axially outwardly facing carrier-surface 22F in the axial direction D1. The axially inwardly facing carrier-surface 22G is configured to face toward the axial center plane CP of the human powered vehicle 2 in the axial direction D1 in a mounted state where the rear sprocket assembly 10 is mounted to the human powered vehicle 2.

The axially inwardly facing carrier-surface 22G is provided to the first radial section 22M and the second radial section 22N. The axially outwardly facing carrier-surface 22F is provided to the first radial section 22M and the second radial section 22N.

Figure 10:
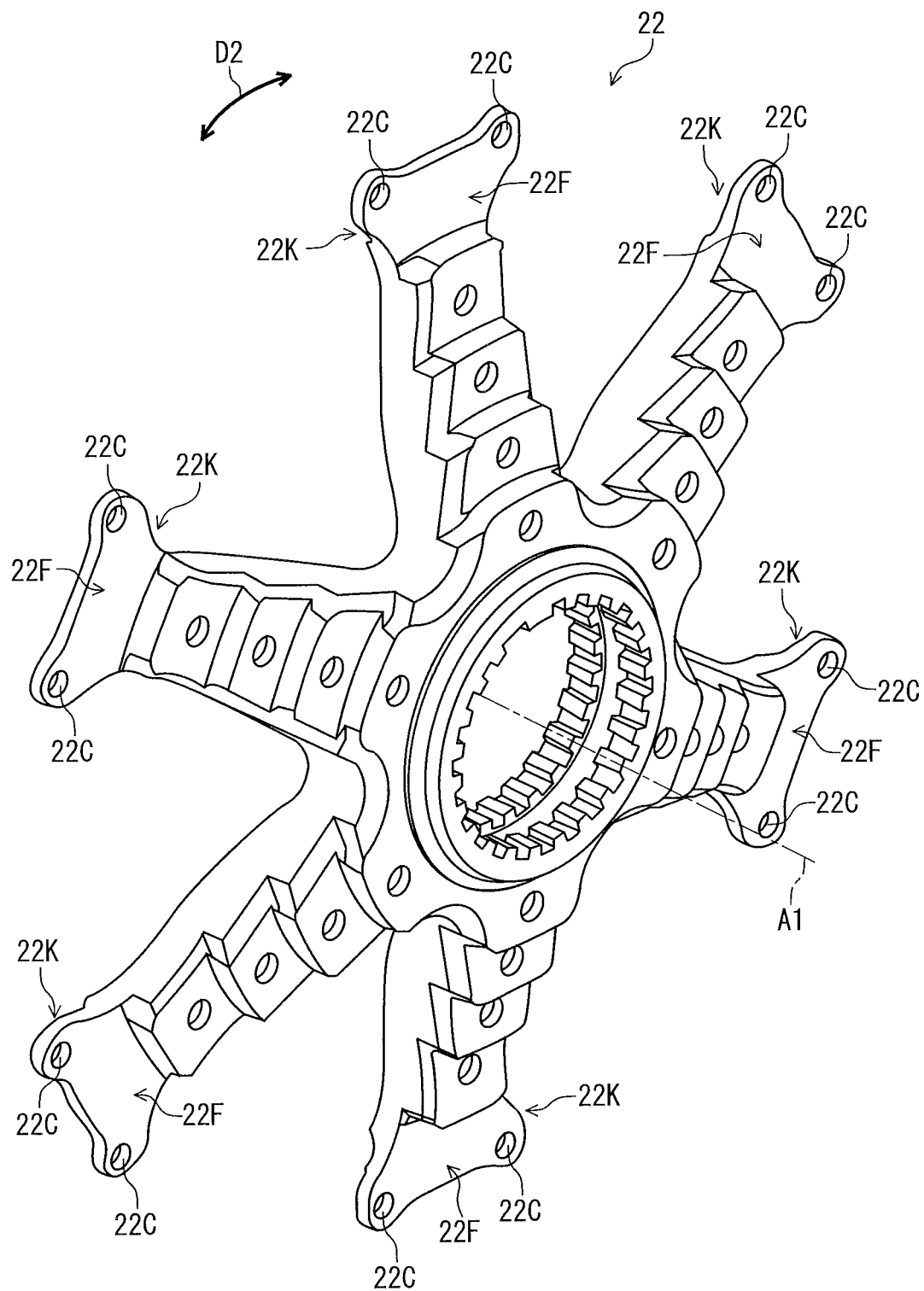
FIG. 10 is a perspective view of the sprocket carrier of the rear sprocket assembly illustrated in FIG. 3.
Figure 11:
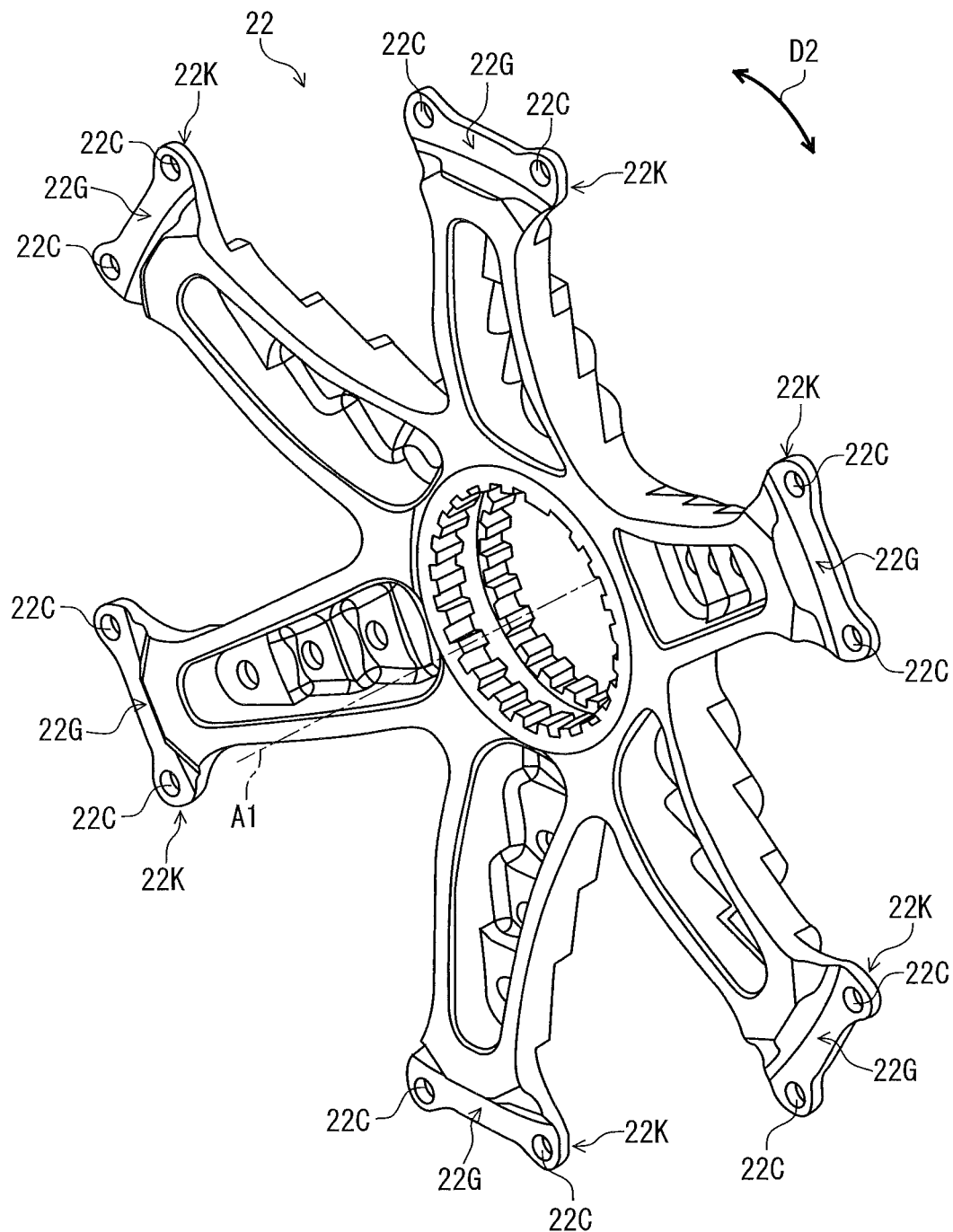
FIG. 11 is another perspective view of the sprocket carrier of the rear sprocket assembly illustrated in FIG. 3.

As seen in FIGS. 10 and 11, the sprocket carrier 22 has at least one axially outwardly facing carrier-surface 22F and at least one axially inwardly facing carrier-surface 22G. The sprocket carrier 22 has at least two axially outwardly facing carrier-surfaces 22F and at least two axially inwardly facing carrier-surfaces 22G. The at least two axially outwardly facing carrier-surfaces 22F are arranged in the circumferential direction D2. The at least two axially inwardly facing carrier-surfaces 22G are arranged in the circumferential direction D2.

The at least two sprocket mounting portions 22K respectively include the at least two axially outwardly facing carrier-surfaces 22F. The at least two sprocket mounting portions 22K respectively include the at least two axially inwardly facing carrier-surfaces 22G. The sprocket mounting portion 22K includes the axially outwardly facing carrier-surface 22F and the axially inwardly facing carrier-surface 22G.

The first radial section 22M has a first maximum axial length L1 with respect to the axial direction D1. The second radial section 22N has a second maximum axial length L2 with respect to the axial direction D1. The second maximum axial length L2 is larger than the first maximum axial length L1. The first maximum axial length L1 is defined in the axial direction D1. The second maximum axial length L2 is defined in the axial direction D1.

The first maximum axial length L1 is defined between the axially outwardly facing carrier-surface 22F and the axially inwardly facing carrier-surface 22G in the axial direction D1. The first sprocket SP1 is in contact with the axially inwardly facing carrier-surface 22G in a state where the first sprocket SP1 is coupled to the sprocket carrier 22. The second sprocket SP2 is in contact with the axially outwardly facing carrier-surface 22F in a state where the second sprocket SP2 is coupled to the sprocket carrier 22. Namely, the first maximum axial length L1 is defined between the first sprocket SP1 and the second sprocket SP2 in the axial direction D1.

The axially inwardly facing carrier-surface 22G includes an axial surface 22R, an additional axial surface 22P, and a curved surface 22Q. The axial surface 22R faces toward the axial center plane CP in the axial direction D1. The additional axial surface 22P faces toward the axial center plane CP in the axial direction D1. The curved surface 22Q faces toward the axial center plane CP in the axial direction D1. The first maximum axial length L1 is defined between the axially outwardly facing carrier-surface 22F and the axial surface 22R in the axial direction D1. The second maximum axial length L2 is defined between the axially outwardly facing carrier-surface 22F and the additional axial surface 22P in the axial direction D1. In the present embodiment, the axial surface 22R is perpendicular to the axial direction D1. The additional axial surface 22P is non-parallel to and non-perpendicular to the axial direction D1. The additional axial surface 22P is inclined relative to the axial direction D1. However, the additional axial surface 22P can be perpendicular to the axial direction D1 if needed or desired. The axial surface 22R can be non-perpendicular to the axial direction D1 if needed or desired.

Figure 12:
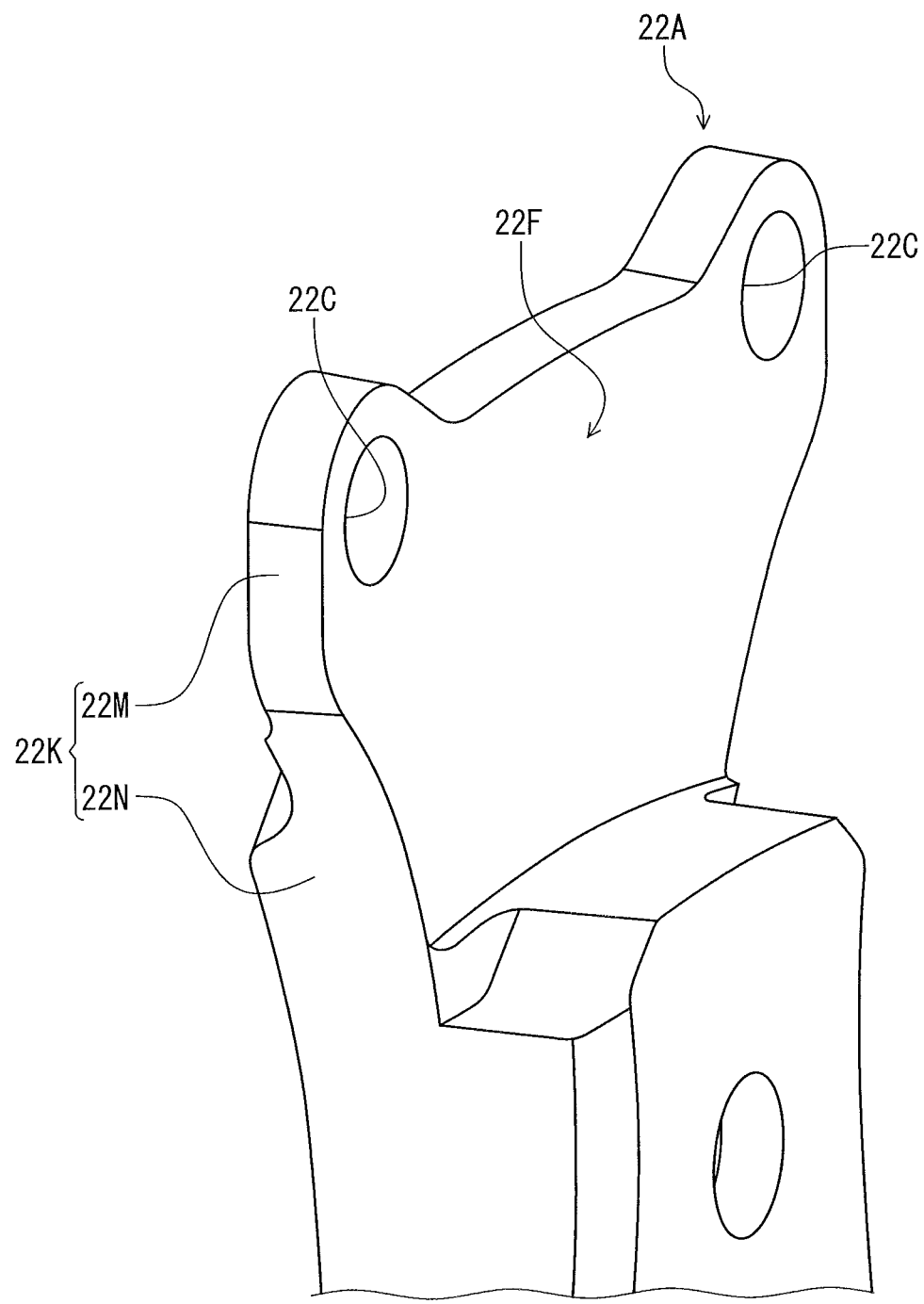
FIG. 12 is a partial perspective view of the sprocket carrier of the rear sprocket assembly illustrated in FIG. 3.
Figure 13:
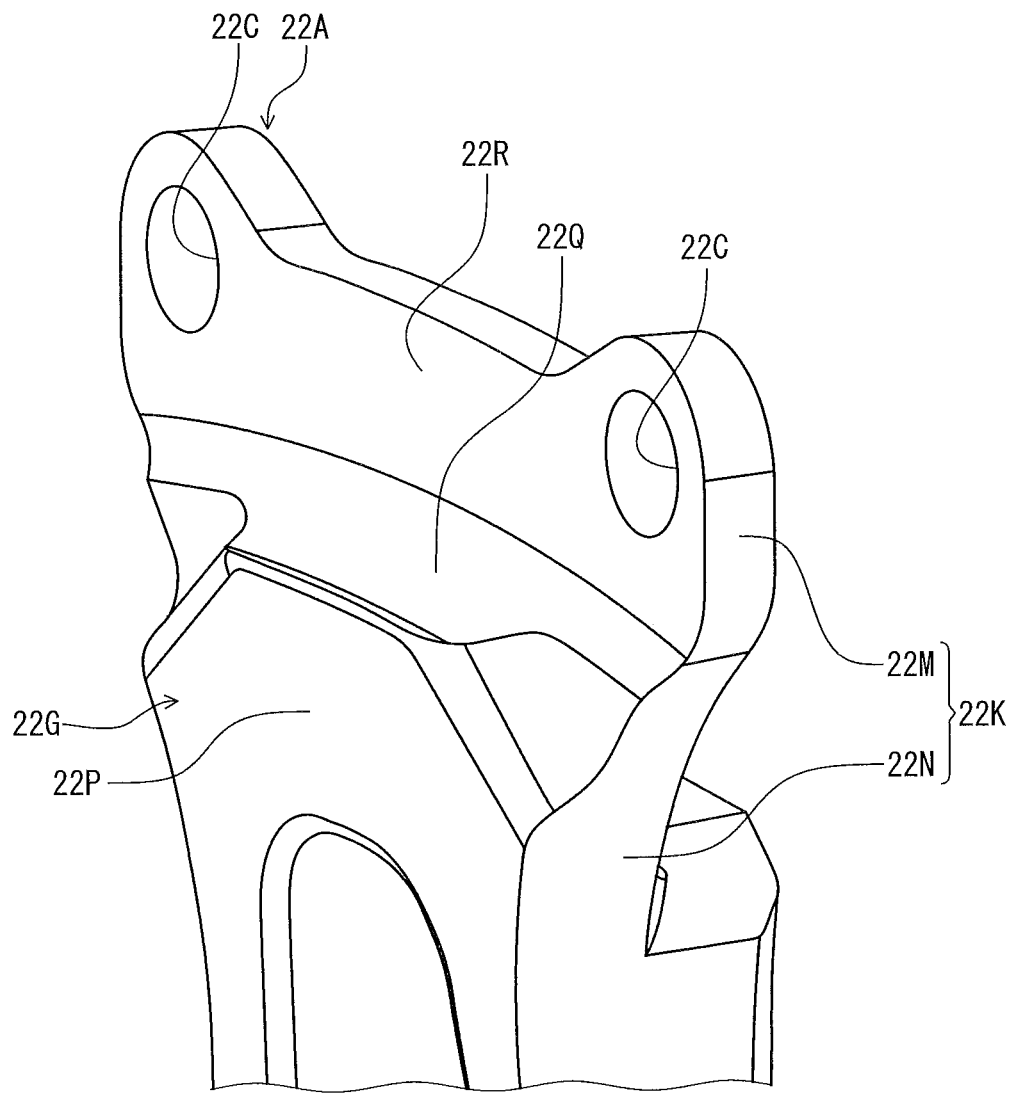
FIG. 13 is another partial perspective view of the sprocket carrier of the rear sprocket assembly illustrated in FIG. 3.

As seen in FIGS. 12 and 13, the axial surface 22R extends in the circumferential direction D2. The curved surface 22Q extends in the circumferential direction D2. Two of the plurality of first holes 22C are provided on the axially outwardly facing carrier-surface 22F and the axially inwardly facing carrier-surface 22G. As seen in FIG. 13, two of the plurality of first holes 22C are provided on the axial surface 22R.

As seen in FIG. 9, the first sprocket body SP1A has at least one first mounted portion SP1M. The at least one first mounted portion SP1M is configured to be mounted to the axially inwardly facing carrier-surface 22G of the at least one sprocket mounting portion 22K of the sprocket carrier 22. The at least one first mounted portion SP1M is configured to axially contact the first radial section 22M of the at least one sprocket mounting portion 22K of the sprocket carrier 22 with respect to the axial direction D1. The first mounted portion SP1M is configured to axially contact the axially inwardly facing carrier-surface 22G in the axial direction D1.

The at least one first mounted portion SP1M of the first sprocket body SP1A is configured to be free of axial contact with the second radial section 22N of the at least one sprocket mounting portion 22K of the sprocket carrier 22. The at least one first mounted portion SP1M is provided radially outwardly of the second radial section 22N.

The second sprocket body SP2A has at least one second mounted portion SP2M. The at least one second mounted portion SP2M is configured to be mounted to the axially outwardly facing carrier-surface 22F of the at least one sprocket mounting portion 22K of the sprocket carrier 22. The at least one second mounted portion SP2M is configured to axially contact the first radial section 22M and the second radial section 22N of the at least one sprocket mounting portion 22K of the sprocket carrier 22 with respect to the axial direction D1. The second mounted portion SP2M is configured to axially contact the axially outwardly facing carrier-surface 22F in the axial direction D1. The first maximum axial length L1 is defined between the first mounted portion SP1M and the second mounted portion SP2M in the axial direction D1.

The first sprocket SP1 is made of a first material. The second sprocket is made of a second material. The sprocket carrier is made of a third material. The first material includes a metallic material. The second material includes a metallic material. The third material includes a metallic material or a non-metallic material. For example, the first material is different from the second material. The third material is different from at least one of the first material and the second material. The first material includes aluminum. The second material includes iron. The third material includes one of aluminum and a non-metallic material. Examples of the non-metallic material include a resin material. Namely, the first sprocket SP1 is made of aluminum. The second sprocket SP2 is made of iron. The sprocket carrier 22 is made of one of aluminum and a non-metallic material. However, the first sprocket SP1 can be made of materials other than aluminum if needed or desired. The second sprocket SP2 can be made of materials other than iron if needed or desired. The sprocket carrier 22 can be made of materials other than aluminum and the non-metallic material if needed or desired. For example, the second sprocket SP2 can be made of aluminum.

The first sprocket body SP1A has a first maximum axial body-length L5. The first maximum axial body-length L5 is defined in the axial direction D1. The second sprocket body SP2A has a second maximum axial body-length L6. The second maximum axial body-length L6 is defined in the axial direction D1.

In the present embodiment, the first maximum axial body-length L5 is longer than the second maximum axial body-length L6. The first maximum axial body-length L5 is longer than the first maximum axial length L1 of the first radial section 22M. The second maximum axial body-length L6 is longer than the first maximum axial length L1 of the first radial section 22M. The first maximum axial body-length L5 is shorter than the second maximum axial length L2 of the second radial section 22N. The second maximum axial body-length L6 is shorter than the second maximum axial length L2 of the second radial section 22N. However, the first maximum axial body-length L5 can be shorter than the second maximum axial body-length L6 if needed or desired. The first maximum axial body-length L5 can be shorter than the first maximum axial length L1 of the first radial section 22M if needed or desired. The second maximum axial body-length L6 can be shorter than the first maximum axial length L1 of the first radial section 22M if needed or desired. The first maximum axial body-length L5 can be longer than the second maximum axial length L2 of the second radial section 22N if needed or desired. The second maximum axial body-length L6 can be longer than the second maximum axial length L2 of the second radial section 22N if needed or desired.

In the present embodiment, the first maximum axial body-length L5 is equal to or larger than 2 mm. The first maximum axial body-length L5 is equal to or smaller than 3.5 mm. The second maximum axial body-length L6 is equal to or larger than 1.5 mm. The second maximum axial body-length L6 is equal to or smaller than 3.5 mm. However, the first maximum axial body-length L5 is not limited to the above range. The second maximum axial body-length L6 is not limited to the above range. The first maximum axial body-length L5 is 2.8 mm in the present embodiment. However, the first maximum axial body-length L5 is not limited to the above value.

For example, the second maximum axial body-length L6 ranges from 1.5 mm to 2.5 mm in a case where the second sprocket SP2 is made of iron. The second maximum axial body-length L6 is 1.95 mm in the case where the second sprocket SP2 is made of iron. The second maximum axial body-length L6 ranges from 2 mm to 3.5 mm in a case where the second sprocket SP2 is made of aluminum. The second maximum axial body-length L6 is 2.8 mm in the case where the second sprocket SP2 is made of aluminum. However, the second maximum axial body-length L6 is not limited to the above ranges and values.

The first maximum axial length L1 of the first radial section 22M is equal to or larger than 1.3 mm. The first maximum axial length L1 of the first radial section 22M is equal to or smaller than 3 mm. The second maximum axial length L2 of the second radial section 22N is equal to or larger than 3.5 mm. The second maximum axial length L2 of the second radial section 22N is equal to or smaller than 5 mm. However, the first maximum axial length L1 is not limited to the above range. The second maximum axial length L2 is not limited to the above range. The first maximum axial length L1 is 1.8 mm in the present embodiment. However, the first maximum axial length L1 is not limited to the above value. The second maximum axial length L2 is 4.2 mm in the present embodiment. However, the second maximum axial length L2 is not limited to the above value.

Figure 14:
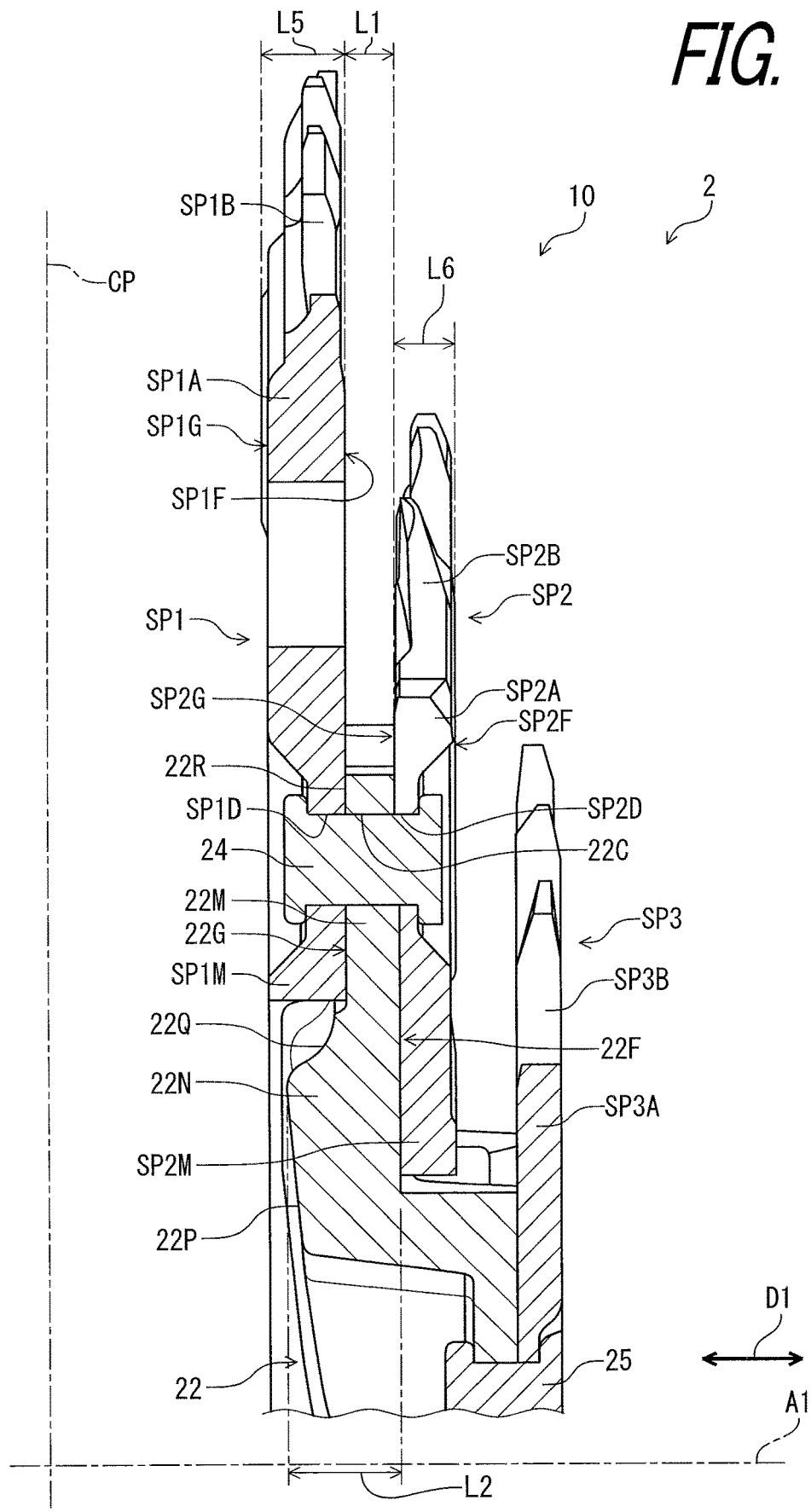
FIG. 14 is a cross-sectional view of the rear sprocket assembly taken along line XIV-XIV of FIG. 3.
Figure 15:
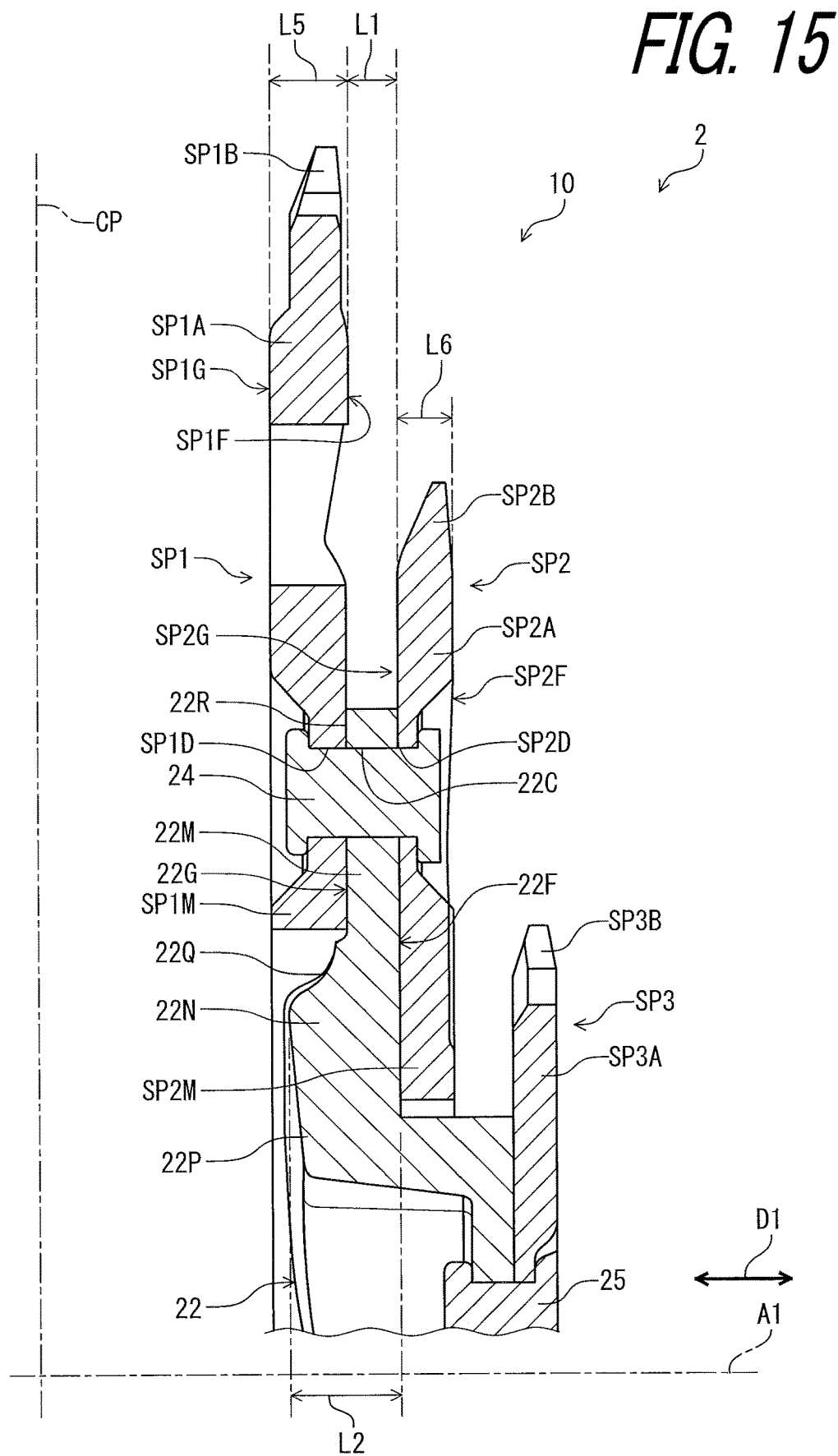
FIG. 15 is a cross-sectional view of the rear sprocket assembly taken along line XV-XV of FIG. 3.

As seen in FIGS. 14 and 15, the first sprocket SP1 and the second sprocket SP2 are mounted to the at least one sprocket mounting portion 22K of the sprocket carrier 22 by at least one common fastener. In the present embodiment, the first sprocket SP1 and the second sprocket SP2 are mounted to the sprocket mounting portion 22K of the sprocket carrier 22 by the first fastener 24. The first sprocket SP1 and the second sprocket SP2 are coupled to the first radial section 22M of the sprocket mounting portion 22K by the first fastener 24. The first fastener 24 extends through the first fastener hole SP1D, the second fastener hole SP2D, and the first hole 22C. However, the first sprocket SP1 and the second sprocket SP2 can be mounted to the at least one sprocket mounting portion 22K of the sprocket carrier 22 by separate fasteners if needed or desired.

Figure 16:
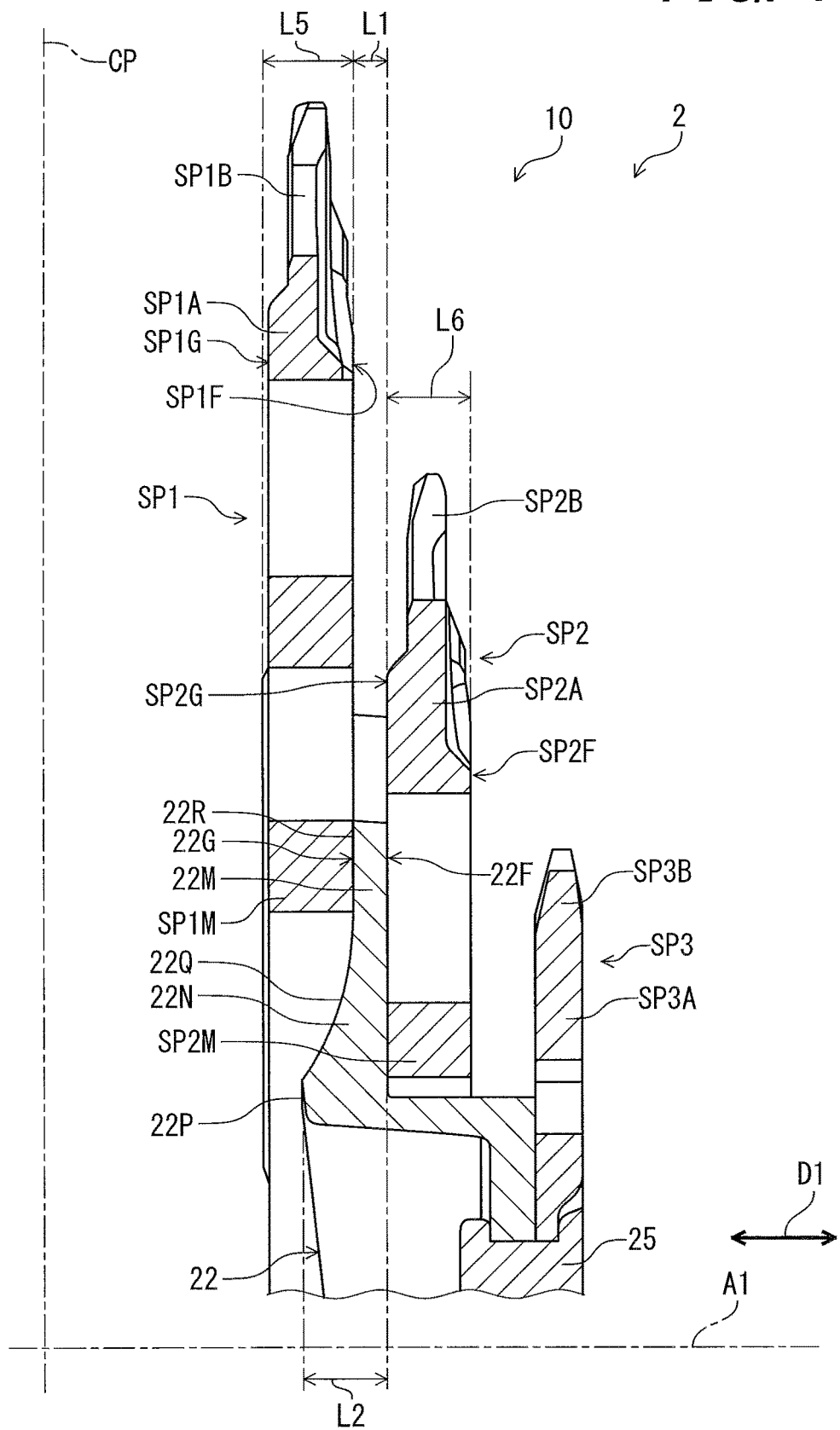
FIGS. 16 to 18 are cross-sectional views of a rear sprocket assembly in accordance with a modification.
Figure 17:
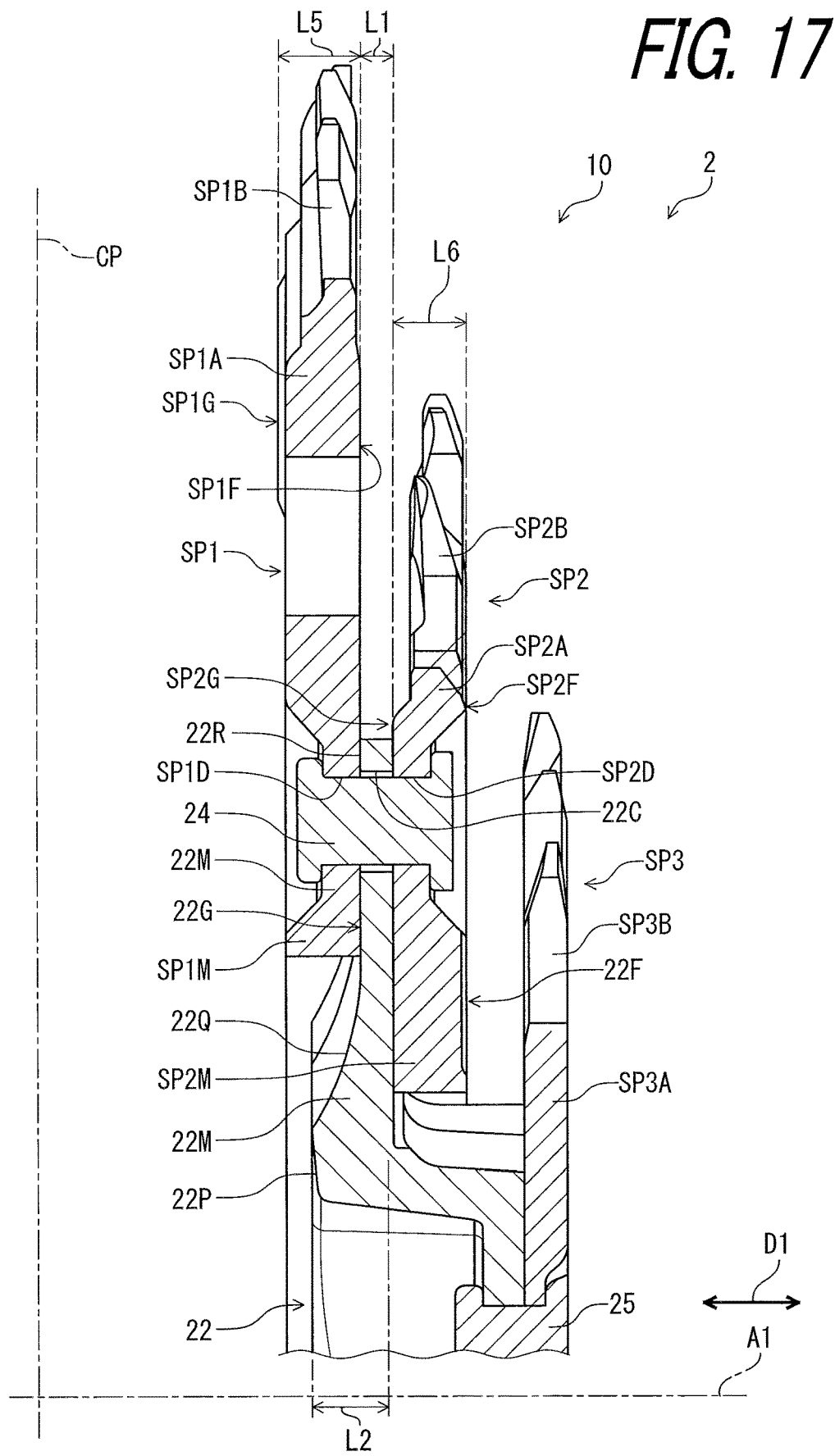
Figure 18:
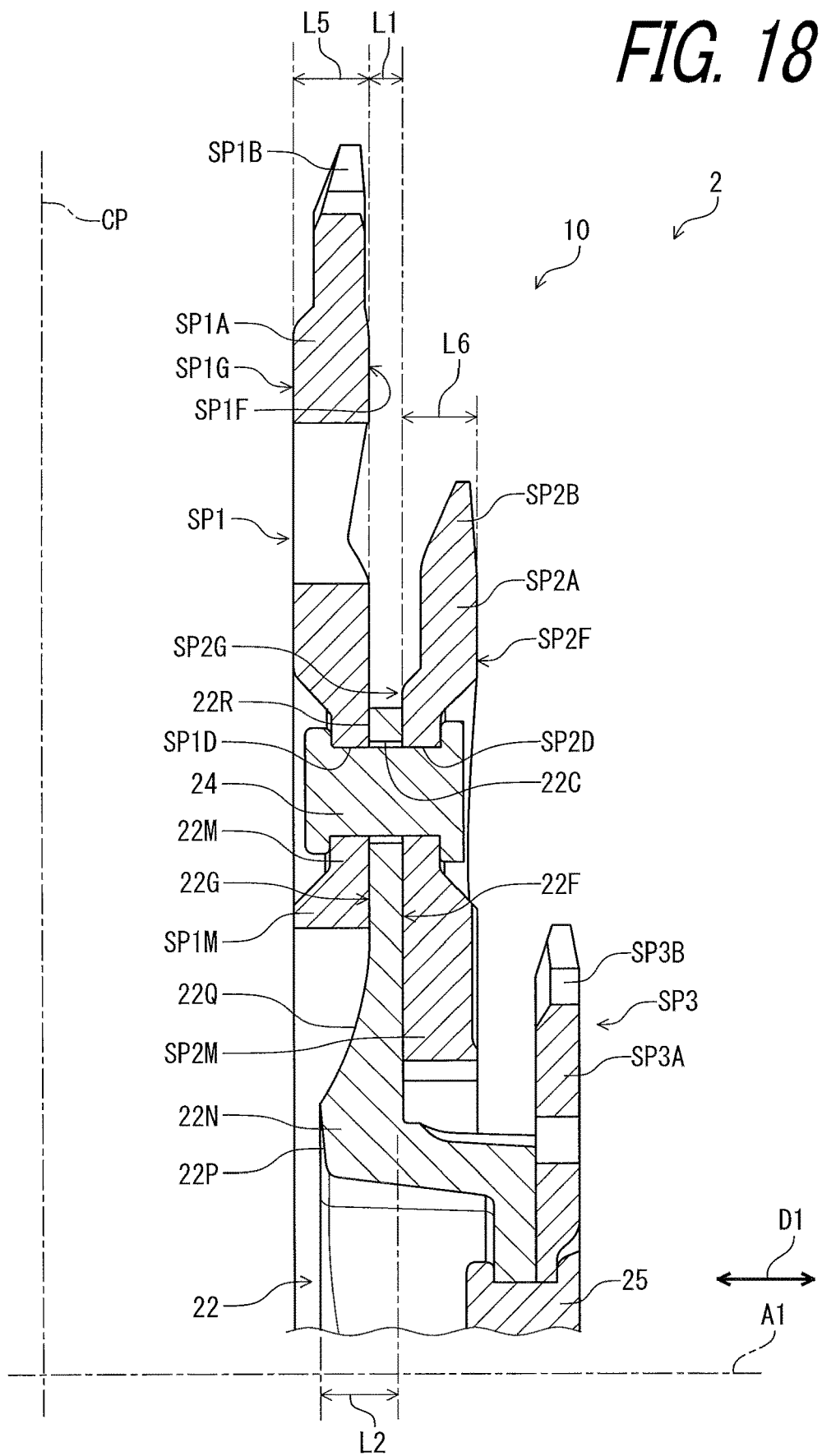

As seen in FIGS. 16 to 18, the first sprocket SP1, the second sprocket SP2, and the sprocket carrier 22 can have shapes other than the shapes depicted in FIGS. 1 to 13.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rear sprocket assembly for a human powered vehicle, the rear sprocket assembly having a rotational center axis defining an axial direction, a radial direction and a circumferential direction, the rear sprocket assembly comprising:
a sprocket carrier having an axially outwardly facing carrier-surface and an axially inwardly facing carrier-surface provided on a reverse side of the axially outwardly facing carrier-surface in the axial direction, the axially inwardly facing carrier-surface being configured to face toward an axial center plane of the human powered vehicle in the axial direction in a mounted state where the rear sprocket assembly is mounted to the human powered vehicle, the sprocket carrier including at least one sprocket mounting portion having a first radial section and a second radial section positioned radially inwardly from the first radial section in the radial direction, the first radial section having a first maximum axial length with respect to the axial direction, the second radial section having a second maximum axial length with respect to the axial direction, the second maximum axial length being larger than the first maximum axial length, the second maximum axial length is defined between the axially outwardly facing carrier-surface and an additional axial surface in the axial direction, the additional axis surface is non-parallel to and non-perpendicular to the axial direction;

a first sprocket including a first sprocket body and a plurality of first sprocket teeth extending radially outwardly from the first sprocket body in the radial direction, the plurality of first sprocket teeth being disposed on the first sprocket body in the circumferential direction, the first sprocket having a first total tooth number, a first axially outwardly facing surface and a first axially inwardly facing surface provided on a reverse side of the first axially outwardly facing surface in the axial direction, the first axially inwardly facing surface being configured to face toward the axial center plane of the human powered vehicle in the axial direction in the mounted state, the first sprocket body having at least one first mounted portion configured to be mounted to the axially inwardly facing carrier-surface of the at least one sprocket mounting portion of the sprocket carrier, the at least one first mounted portion being configured to axially contact the first radial section of the at least one sprocket mounting portion of the sprocket carrier with respect to the axial direction; and a second sprocket including a second sprocket body and a plurality of second sprocket teeth extending radially outwardly from the second sprocket body in the radial direction, the plurality of second sprocket teeth being disposed on the second sprocket body in the circumferential direction, the second sprocket having a second total tooth number, a second axially outwardly facing surface and a second axially inwardly facing surface provided on a reverse side of the second axially outwardly facing surface in the axial direction, the second total tooth number being smaller than the first total tooth number of the first sprocket, the second axially inwardly facing surface being configured to face toward the first axially outwardly facing surface of the first sprocket in the axial direction, the second sprocket body having at least one second mounted portion configured to be mounted to the axially outwardly facing carrier-surface of the at least one sprocket mounting portion of the sprocket carrier, the at least one second mounted portion being configured to axially contact the first radial section and the second radial section of the at least one sprocket mounting portion of the sprocket carrier with respect to the axial direction, the second sprocket being adjacent to the first sprocket without another sprocket between the first sprocket and the second sprocket in the axial direction.

2. The rear sprocket assembly according to claim 1, wherein
the first sprocket body has a first maximum axial body-length that is equal to or larger than 2 mm.

3. The rear sprocket assembly according to claim 2, wherein
the first maximum axial body-length is equal to or smaller than 3.5 mm.

4. The rear sprocket assembly according to claim 1, wherein
the second sprocket body has a second maximum axial body-length that is equal to or larger than 1.5 mm.

5. The rear sprocket assembly according to claim 4, wherein
the second maximum axial body-length is equal to or smaller than 3.5 mm.

6. The rear sprocket assembly according to claim 1, wherein
the first maximum axial length of the first radial section is equal to or larger than 1.3 mm.

7. The rear sprocket assembly according to claim 6, wherein
the first maximum axial length of the first radial section is equal to or smaller than 3 mm.

8. The rear sprocket assembly according to claim 1, wherein
the second maximum axial length of the second radial section is equal to or larger than 3.5 mm.

9. The rear sprocket assembly according to claim 8, wherein
the second maximum axial length of the second radial section is equal to or smaller than 5 mm.

10. The rear sprocket assembly according to claim 1, wherein
the first sprocket is made of aluminum.

11. The rear sprocket assembly according to claim 1, wherein
the second sprocket is made of iron.

12. The rear sprocket assembly according to claim 1, wherein
the second sprocket is made of aluminum.

13. The rear sprocket assembly according to claim 1, wherein
the sprocket carrier is made of one of aluminum and a non-metallic material.

14. The rear sprocket assembly according to claim 1, wherein
the first sprocket and the second sprocket are mounted to the at least one sprocket mounting portion of the sprocket carrier by at least one common fastener.

15. The rear sprocket assembly according to claim 1, wherein
the at least one first mounted portion of the first sprocket body is configured to be free of axial contact with the second radial section of the at least one sprocket mounting portion of the sprocket carrier.

* * * * *